United States Patent [19]

Schepacz

[11] 4,163,701
[45] Aug. 7, 1979

[54] METHOD OF ELECTROCHEMICAL MACHINING OF POLYPHASE ALLOYS

[75] Inventor: Charles Schepacz, Firminy, France

[73] Assignee: Centre Technique des Industries Mecaniques, Senlis, France

[21] Appl. No.: 877,110

[22] Filed: Feb. 13, 1978

[30] Foreign Application Priority Data

Feb. 24, 1977 [FR] France .................. 77 05448

[51] Int. Cl.$^2$ ............................ C25F 3/00; C25F 3/08
[52] U.S. Cl. ............................. 204/129.75; 204/129.8
[58] Field of Search ................... 204/129.75, 129.8

[56] References Cited

U.S. PATENT DOCUMENTS

| | | | |
|---|---|---|---|
| 3,088,889 | 5/1963 | La Boda | 204/129.75 |
| 3,355,369 | 11/1967 | Chaperon et al. | 204/129.75 |
| 3,429,791 | 2/1969 | La Boda | 204/129.75 |
| 4,060,467 | 11/1977 | Maeda et al. | 204/129.75 |

*Primary Examiner*—T. M. Tufariello
*Attorney, Agent, or Firm*—McDougall, Hersh & Scott

[57] ABSTRACT

An electric current is passed through an electrolyte having a neutral pH, between an inert tool-electrode and the alloy which is to be machined to the shape of the tool-electrode. The electrolyte contains fluoride and/or fluoborate ions as well as complexing ions both for the carbide-phase metal or metals of the alloy and for the metallic-phase metal or metals of the alloy.

7 Claims, No Drawings

METHOD OF ELECTROCHEMICAL MACHINING OF POLYPHASE ALLOYS

The present invention relates to machining techniques and more specifically to electrochemical machining techniques which are applicable to polyphase alloys, especially industrial materials having a base of metallic carbides.

In the electrochemical machining process, the part to be machined is immersed in an electrolyte and subjected to surface dissolution by means of an electric current which flows through said electrolyte between two electrodes. One electrode is constituted by the part to be machined whilst the other electrode is immersed in the same electrolyte and constituted by a tool-electrode which forms the cathode and the profile of which is chosen according to the intended shape of the part to be machined.

The majority of metallic carbides employed in the industry are in fact constituted by a refractory phase of tungsten carbide or a mixture of various metallic carbides (especially tungsten, niobium, tantalum, titanium carbides) which are dispersed in a metallic phase matrix or binder. Machining of these carbides by the electrochemical process presents a problem which is particularly difficult to solve. In general, each constituent of a composite material dissolves under particular electrical conditions. It is found in practice that, when polyphase carbide-metal alloys are treated in the usual electrolytes, the metallic matrix can readily be machined whereas the carbides dissolve only with great difficulty.

In order that the machining operation may nevertheless be performed, hybrid methods have been developed for combining electrochemical dissolution with an abrasion effect. This effect is obtained either by means of a grindstone or by adding abrasive particles to the electrolyte solution and applying ultrasonic vibrations to the tool-electrode. In both cases the method is technically difficult to carry into effect and applies only to the machining of parts having simple shapes.

In another method which has been developed with a view to avoiding the need to have recourse to abrasive action, the electrochemical machining process is performed by applying a dissymmetrical alternating current. When employed alone, however, this solution results in the loss of one of the essential advantages of the electrochemical machining process by giving rise to variable and heterogeneous wear of the electrodes.

In contradistinction to the methods of the prior art, the present invention makes it possible to carry out uniform electrochemical machining of parts formed of poly-phase alloys of the carbide-metal type while avoiding wear of electrodes.

The present invention is essentially directed to a method of electrochemical machining of two-phase alloys comprising at least one carbide phase and at least one metallic phase such as those in which a carbide phase of one or a number of metallic phases is dispersed in a metallic-phase matrix. Said method consists in passing an electric current between an inert tool-electrode and the alloy to be machined to the shape of the tool-electrode, within an electrolyte containing halide ions as well as complexing ions both for the carbide-phase metal or metals and for the metallic-phase metal or metals.

It is especially worthy or note that, in accordance with a preferred embodiment of the invention, the use of an electrolyte containing ammonium fluoride or fluoborate makes it possible to dissolve the different phases of all the usual carbide-base materials under the same conditions by operating at a substantially neutral and non-aggressive pH value. It proves advantageous to make use of an electrolyte consisting of an ammonium fluoride solution having a pH value within the range of 6 to 8.

The advantage of the method in accordance with the invention lies in the possibility of making use of direct current. However, in one of the preferred alternative embodiments of the method, a dissymmetrical low-frequency alternating current is employed. This accordingly prevents the formation of any deposit at the surface of the tool-electrode while retaining the essential advantage of absence of wear of said electrode. The current can advantageously have a frequency within the range of 0.1 to 5 or 0.5 to 5 cycles per second and preferably not more than about 1 Hertz and a ratio of relative half-wave time-widths of the order of 3 in the case of the machining voltage time-width to 1 in the case of the reversal time-width and more generally from about 2/1 to about 10/1. The value of the machining voltage is usually chosen as a function of the rate of feed in order to ensure that the clearance between the tool-electrode and the machined part permits satisfactory flow of the electrolyte. It may critically vary from 8 to 20 volts. The reversal voltage is advantageously fixed at a value of the order of 4 volts in an absolute value (i.e. from −3.5 to −4.5 volts).

The conditions given in the foregoing have been found particularly advantageous for ensuring absence of wear of the electrode but should nevertheless be considered as non-limitative. Under these conditions it is possible in particular to modify both the value of the ratio of the positive half-wave to the negative half-wave and the value of the amplitude of the positive voltage; modification of the first value is intended to ensure total dissolution of the deposit formed on the tool-cathode during the negative half-wave. Modification of the second value is intended to achieve total dissolution without any attack of the tool itself.

In order to constitute the tool-electrodes, preference can be given to the use of aluminum and its alloys, for example the grades designated as AG3 or AU4G.

In one example of application of the invention which is given without any limitation being implied, electrochemical machining of a material essentially consisting of tungsten carbide in a cobalt matrix is performed under the following conditions:

| | |
|---|---|
| Composition of the machined material: | 15% Co, 85% CW (by weight) |
| Electrolyte: | NH$_4$F at 3.0 moles/l, 25° C. |
| Current: | A.C. square-wave, 1 c/s |
| Positive voltage: | + 18.0 V |
| Negative voltage: | − 4.0 V |
| Ratio of positive half-wave/ negative half-wave time-widths: | 3:1 |
| Tool-electrode of AU4G alloy. | |

Cylindrical-piercing tests carried out with tools of different diameters produce the following results:

| Tool diameter | φ 12.5mm/4mm | φ 3.5mm/1.5mm | φ 1.0mm/0.4mm |
|---|---|---|---|
| Machining speed | 0.2mm/min | 0.36mm/min | 0.33mm/min |
| Current density obtained | 60 A/cm$^2$ | 50 A/cm$^2$ | 200 A/cm$^2$ |
| Diameter of cavity obtained | 13.0mm | 3.8 mm | 1.20 mm |
| Machining depth | 8 mm | 8 mm | 8 mm |

A high standard of machining performance and reliability is achieved as well as an excellent state of surface. In the operational process, the cation and the anion of the electrolyte both take part at the same time in the dissolution of the oxide which froms the carbide (tungsten), by formation of a soluble complex. The formation of soluble ammoniacal complexes from the cobalt of the matrix has the effect of producing a disturbance in the total precipitation of this metal.. The deposit formed on the cathode is dissolved progressively as it appears.

Good quality of machining is thus maintained. Despite the fact that the tool-electrode is made of an inexpensive aluminium alloy, no wear is observed. The equipment required for carrying out the method is simple and low in cost. The electrolyte has low corrosive action. The electrical characteristics of the machining current can be maintained at the same values irrespective of the shape of the electrode and the grade of carbide to be machined.

The method is clearly not limited to the particular conditions which have been specifically mentioned by way of example and many alternative forms can be contemplated without thereby departing either from the scope or the spirit of the invention.

I claim:

1. A method of electrochemically machining two-phase alloys comprising at least one metallic carbide phase and one metallic phase, comprising the step of passing an electric current between an inert tool-electrode and the alloy to be machined to the shape of the tool-electrode within an electrolyte containing ammonium fluoride and/or ammonium fluroborate and having a pH value within the range of 6 to 8.

2. A method as defined in claim 1, wherein the operation is performed with direct current.

3. A method as defined in claim 1, wherein dissymmetrical alternating current is employed.

4. A method as defined in claim 3, wherein the current frequency is within the range of 0.1 to 1.0 c/s.

5. A method as defined in claim 3, wherein the ratio of the time-width of the positive half-wave to that of the negative half-wave is of the order of 3 to 1.

6. A method as defined in claim 1, wherein the tool-electrode is of aluminium or aluminum alloy.

7. Machined parts obtained by means of the method defined in claim 1.

* * * * *